United States Patent [19]

Tanaka et al.

[11] Patent Number: 5,499,932
[45] Date of Patent: Mar. 19, 1996

[54] CONNECTOR ASSEMBLY FOR A PHOTOELECTRIC SENSOR

[75] Inventors: Takashi Tanaka, Neyagawa; Masaharu Miyazaki, Hirakata; Yasunori Kasho; Toshiaki Yoshiyasu, both of Katano, all of Japan

[73] Assignee: Matsushita Electric Works, Ltd., Osaka, Japan

[21] Appl. No.: 291,923

[22] Filed: Aug. 18, 1994

[30] Foreign Application Priority Data

Aug. 26, 1993 [JP] Japan .................................. 5-211904

[51] Int. Cl.⁶ ..................................................... H01R 13/58
[52] U.S. Cl. ....................................................... 439/446
[58] Field of Search ............................. 439/11, 164, 165, 439/446, 550; 403/93, 95–97

[56] References Cited

U.S. PATENT DOCUMENTS 5,092,793  3/1992  Stephan ................................... 439/446
5,190,390  3/1993  Ming-Tai ................................ 403/97

FOREIGN PATENT DOCUMENTS 9107244  9/1991  Germany .
414332   2/1992  Japan .
4330848  11/1992 Japan .
5207342  8/1993  Japan .

*Primary Examiner*—Gary F. Paumen
*Attorney, Agent, or Firm*—Stevens, Davis, Miller & Mosher

[57] ABSTRACT

A connector assembly for an photoelectric sensor comprises a casing accommodating the photoelectric sensor, an angled sensor joint provided on the casing, an electric cable connecting the photoelectric sensor to an external circuit; and a cable connector provided at an end of said electric cable and detachably coupled to said sensor joint. The sensor joint is configured to have a rotation axis and is coupled to the casing in such a manner as to swivel about the rotation axis relative to the casing, thus enabling to select a suitable angular orientation of the sensor joint along which the cable is routed for neat wiring arrangement.

5 Claims, 7 Drawing Sheets

CONNECTOR ASSEMBLY FOR A PHOTOELECTRIC SENSOR

BACKGROUND OF THE INVENTION

1. Field of the Invention

The present invention is directed to a connector assembly for a photoelectric sensor, and more particularly to an assembly of connecting the photoelectric sensor to an electric cable leading to an external circuit.

2. Description of the Prior Art

A photoelectric sensor is normally enclosed in a casing with a sensor joint through which an output of the sensor is connected to an electric cable leading to an external circuit. In a prior connector assembly for the photoelectric sensor, the sensor joint is fixed to the casing to have only one orientation so that the cable is connected to extend from the case only along one direction. When the sensor casing is required to be installed in a limited space, such fixed orientation of the sensor joint may sometimes be a conflict with the limited space requirement. In order to avoid the problem, it is required to provide different sensor casings with the sensor joint of differing orientations so that an user can select one of the sensor casing having the sensor joint of desired orientation for an intended installation site.

SUMMARY OF THE INVENTION

The above problem has been eliminated in the present connector assembly for a photoelectric sensor. The connector assembly of the present invention comprises a casing accommodating the photoelectric sensor, an angled sensor joint supported to the casing, an electric cable connecting the photoelectric sensor to an external circuit; and a cable connector provided at an end of the electric cable and detachably coupled to the sensor joint. The sensor joint is characterized by a rotation axis is capable of swiveling about the rotation axis relative to the casing. Thus, the cable can be routed from the casing in any direction so that the sensor casing can be installed neatly together with the cable within a limited space.

Accordingly, it is a primary object of the present invention to provide a connector assembly which is capable of varying the routing direction of the cable depending upon a space requirement in the installation site.

The connector assembly further includes a latch structure for holding the sensor joint at a suitable angular orientation relative to the casing in order to avoid unintentional position changes of the sensor joint, i.e., the routing direction of the cable. The latch structure is formed by parts belonging to the casing and the sensor joint so that the latching of the sensor joint can be realized without using any separate additional member.

It is therefore another object of the present invention to provide a connector assembly which is capable of latching the sensor joint into a suitable orientation, while retaining the number of parts at a minimum.

In a preferred embodiment, the casing includes a cylindrical wall extending from a periphery of an opening formed in the casing, and the sensor joint includes a sleeve projecting through the cylindrical wall into the opening. It is this sleeve that has the rotation axis about which the sleeve rotates within the confine of the cylindrical wall. The latch structure comprises a plurality of detents spaced along an inner periphery of the cylindrical wall and at least one cam which projects on the sleeve. The cam is made capable of riding over the detents and being locked into any suitable one of the detents so as to hold the sensor sleeve into a desired angular orientation relative to the casing.

Preferably, the sensor joint includes a set of pins each adapted to be connected at its one end to the photoelectric sensor and connected at the other end to a corresponding terminal of the plug connector.

These and still other object and advantageous features of the present invention will become more apparent from the following detailed description of the invention when taken in conjunction with the attached drawings.

DETAILED DESCRIPTION OF THE PREFERRED EMBODIMENTS

First embodiment <FIGS. 1 to 16>

Figure 1:
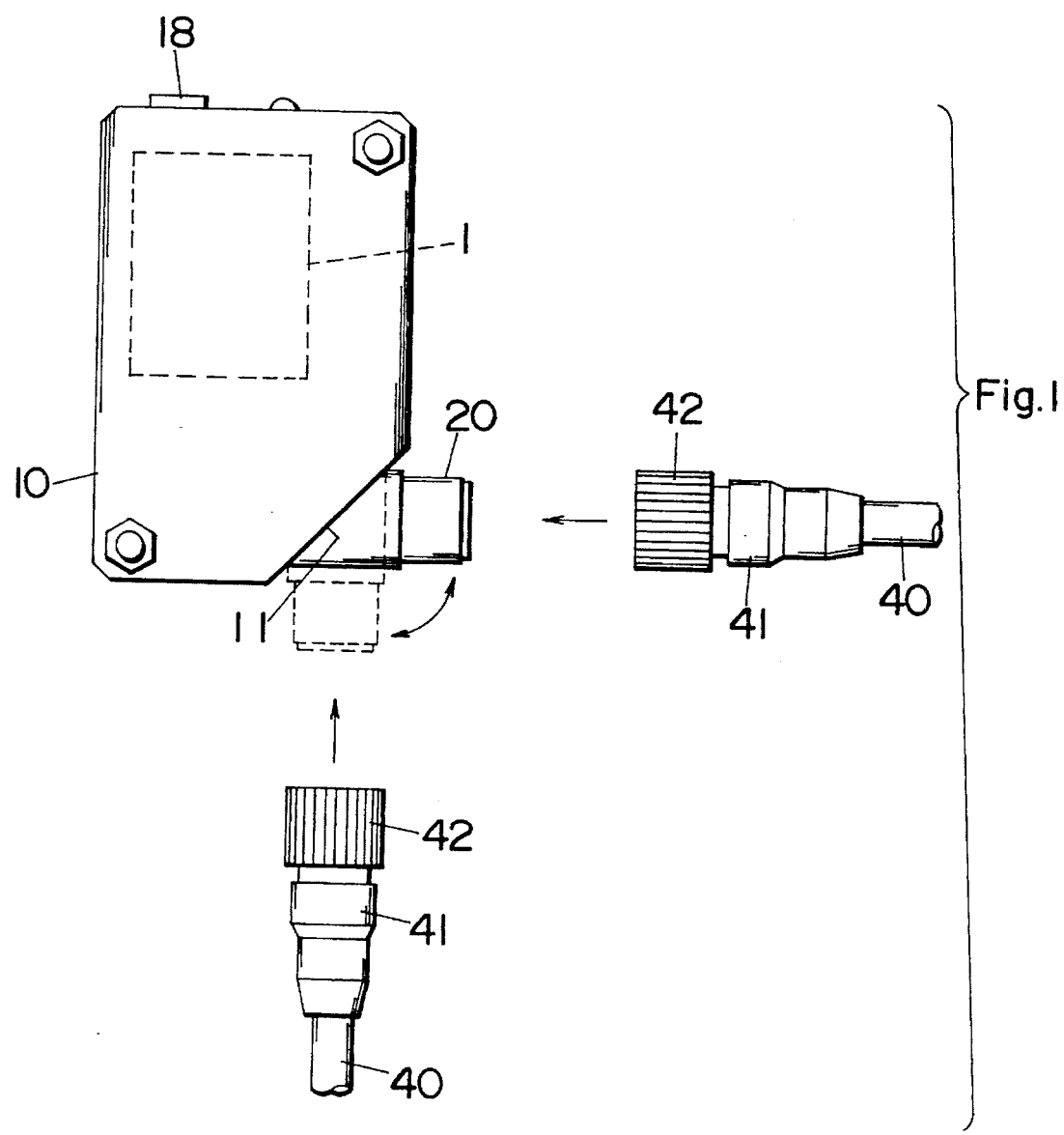
FIG. 1 is an exploded front view of a connector assembly for a photoelectric sensor in accordance with a preferred embodiment of the present invention.

Referring now to FIG. 1, there is shown a connector assembly for an photoelectric sensor in accordance with a first embodiment of the present invention. The photoelectric sensor 1 is accommodated within a rectangular casing 10 with a bevel 11. The casing 10 has a window 18 through which the photoelectric sensor 1 receives an incident light beam to output a corresponding electrical signal. Projecting from the bevel 11 is a sensor joint 20 for detachable connection with a cable connector 41 provided at one end of an electric cable 40 leading to an external circuit (not shown) which processes an output from the photoelectric sensor 1.

The sensor joint 20 is capable of swiveling relative to the casing 10 in a manner as discussed hereinbelow so as to vary its angular orientation so that the cable 40 is routed from the casing 10 along a desired direction. For example, the cable 20 is routed horizontally or vertically as shown in FIG. 1.

Figure 2:
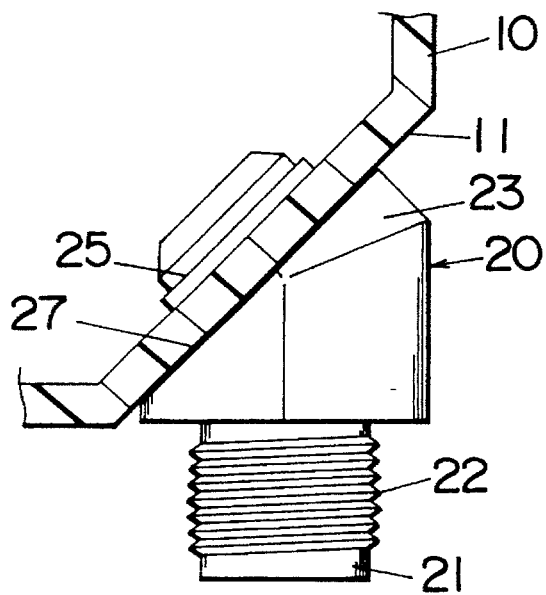
FIG. 2 is a front view of a sensor joint forming the connector assembly and shown as coupled to a casing of the photoelectric sensor.
Figure 3:
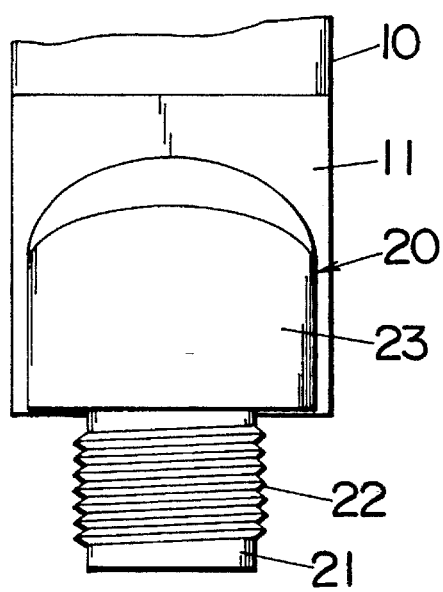
FIG. 3 is a side view of the sensor joint.
Figure 4:
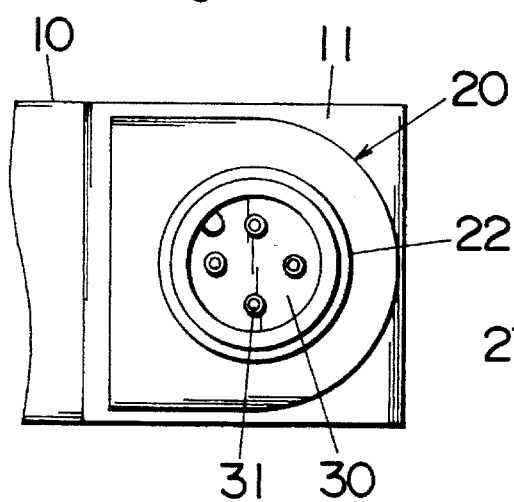
FIG. 4 is a bottom view of the sensor joint.
Figure 5:
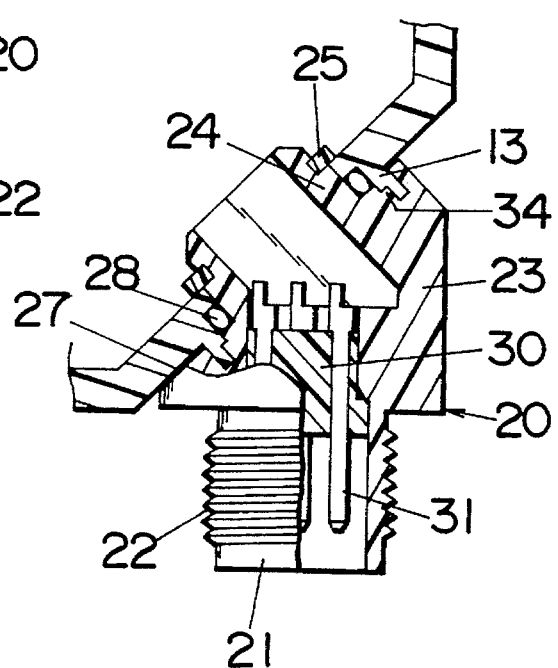
FIG. 5 is a sectional view of the sensor joint.

As shown in FIGS. 2 and 5, the sensor joint 20 comprises a tube body 21 with an external thread 22 and a sleeve 23 integrally extending from the tube body 21 at an angle of 45°. The sleeve 23 is formed at its end with an insertion nose 24 which is fitted into an opening 12 formed in the bevel 11 to be freely rotatable therein. In this sense, the sleeve 23 defines a rotation axis about which the sensor joint 20 rotates relative to the casing 10. A retainer ring 25 is snapped in a groove 26 inside of the casing 10 so as to couple the sensor joint 20 to the casing 10 while permitting it to rotate about the rotation axis. The sleeve 23 is formed adjacent the insertion nose 24 with an enlarged shoulder 27 in facing relation with the bevel 11 of the casing 10. An O-ring 28 is fitted around the insertion nose 24 between the periphery of the opening 12 and the shoulder 27 for a sealing purpose. Tightly fitted within the sensor joint 20 is a base 30 which carries a set of pins 31 each adapted to be soldered at its one end to a corresponding lead from the photoelectric sensor 1. The other ends of the pins 31 project into the tube body 21 to form a pin plug for insertion into a corresponding socket (not shown) provided in the cable joint 41 when the cable connector 41 is connected to the sensor joint 20 by engaging an internally threaded ring 42 of the cable connector on the external thread of the tube body 21.

Figure 7:
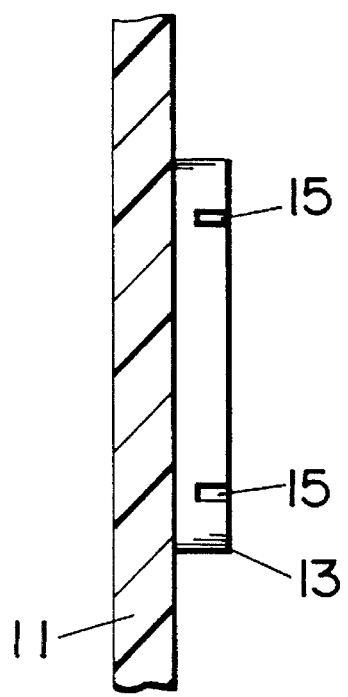
FIG. 7 is a side view of the cylindrical wall.
Figure 6:
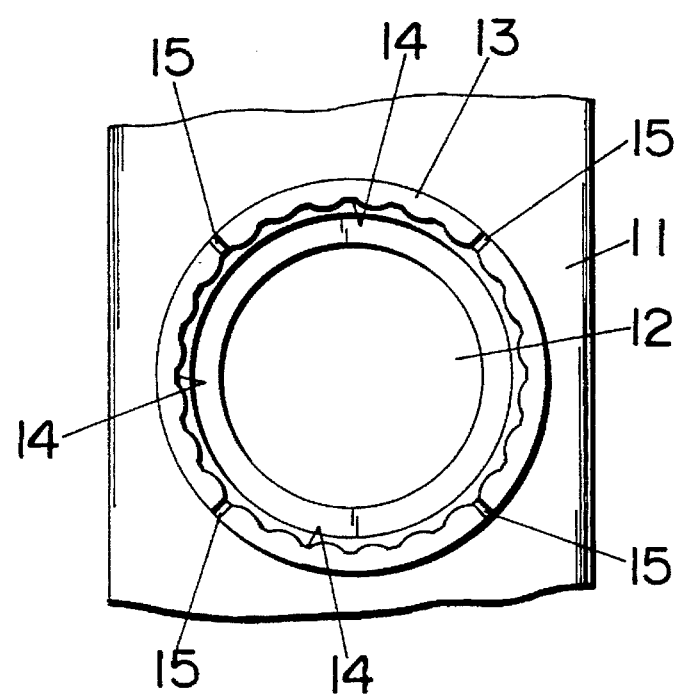
FIG. 6 illustrates a cylindrical wall extending from a portion of the casing.
Figure 8:
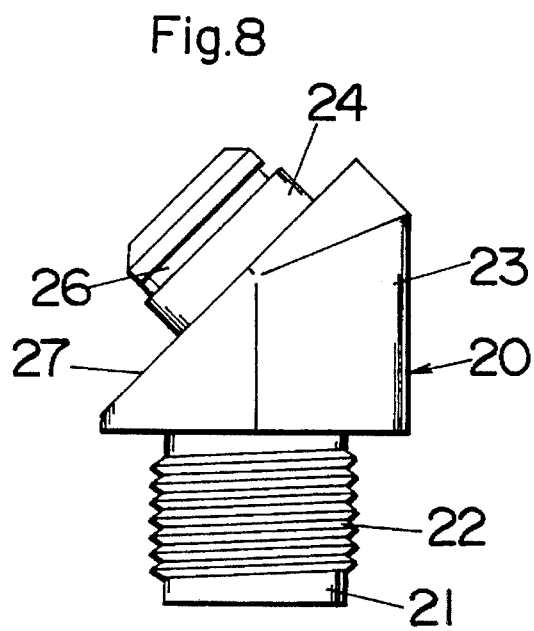
FIGS. 8, 9 and 10 are respectively front, top, and bottom views of the sensor joint.
Figure 9:
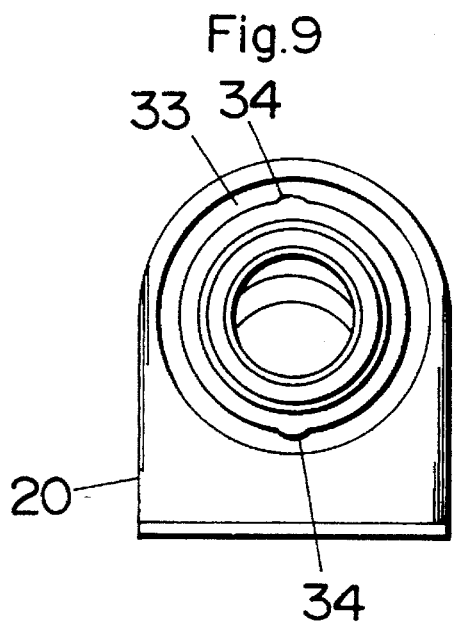
Figure 10:
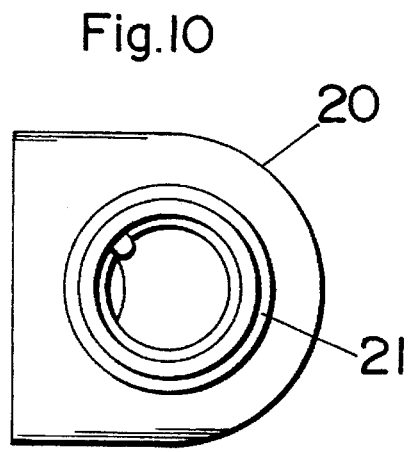
Figure 11:
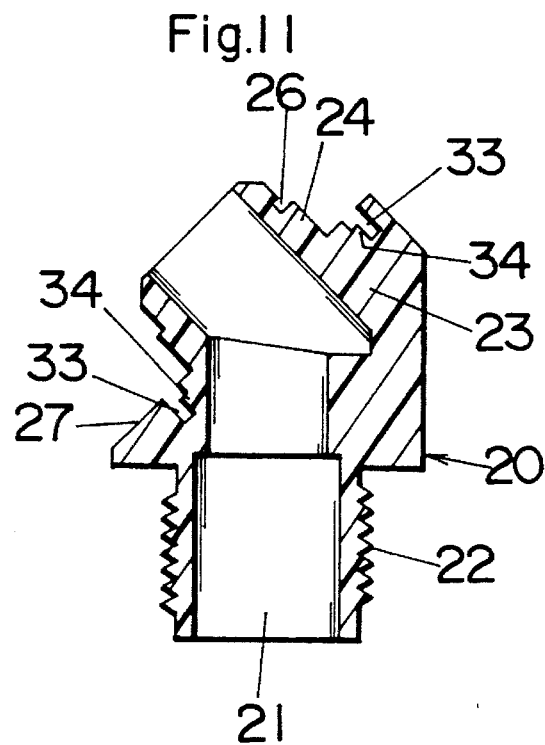
FIG. 11 is a sectional view of the sensor joint.
Figure 12:
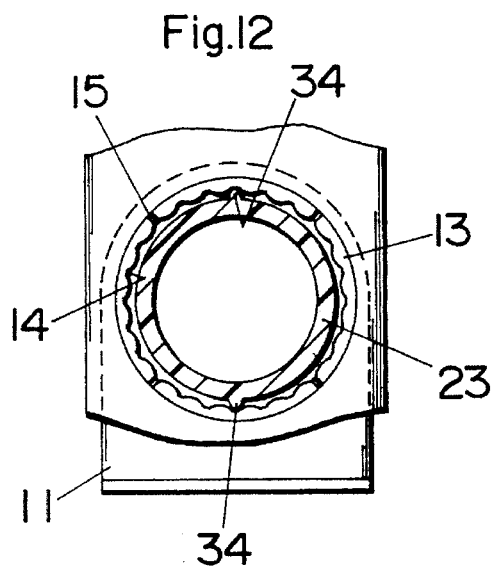
FIG. 12 is a view illustrating the engagement of the sensor joint and a cable connector.
Figure 13:
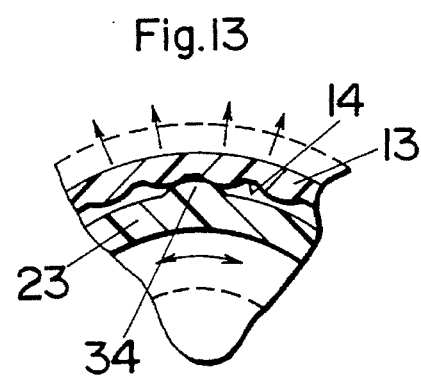
FIG. 13 is an enlarged partial view of a portion of FIG. 12.
Figure 14:
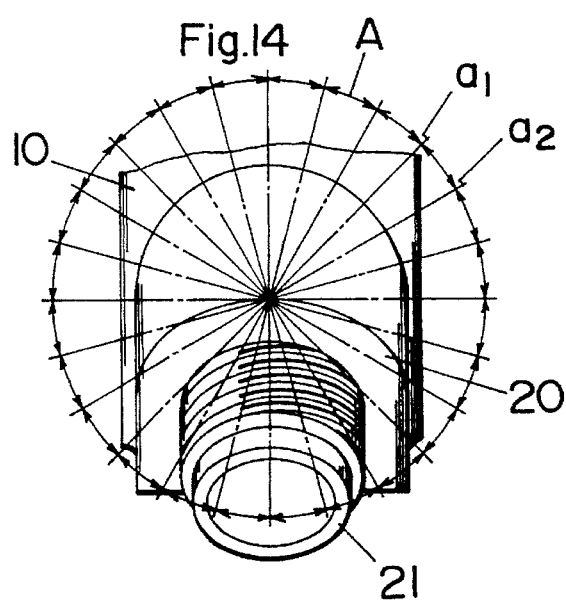
FIG. 14 is a view illustrating the angular displacement of the sensor joint relative to the casing.
Figure 15:
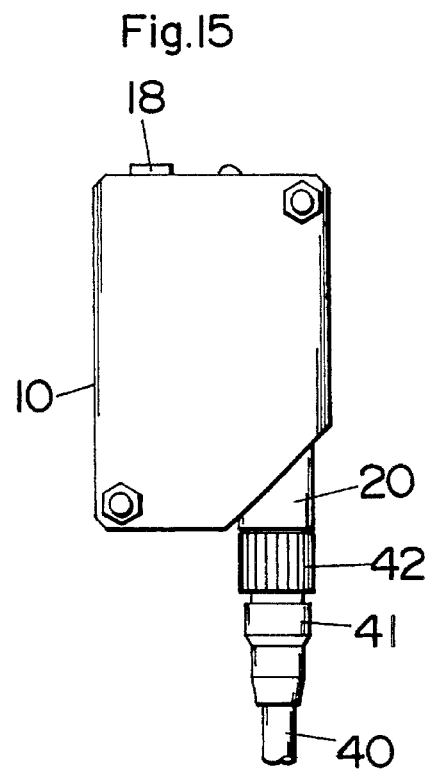
FIGS. 15 and 16 are front views, respectively illustrating different angular orientations of the sensor joint.
Figure 16:
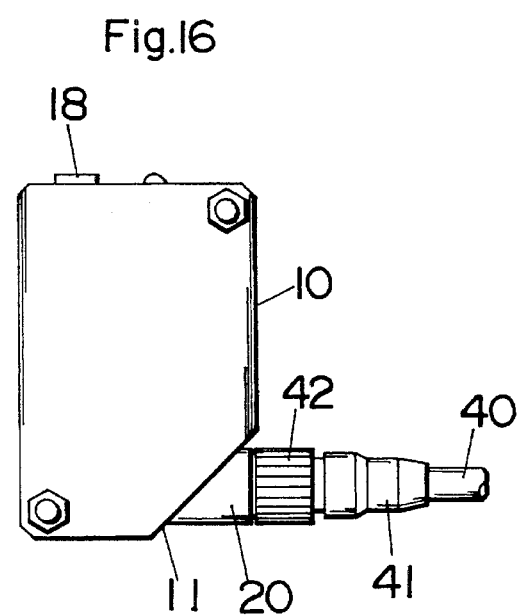

As shown in FIGS. 5 to 7, the bevel 11 of the casing 10 is formed with a cylindrical wall 13 extending integrally and outwardly from the periphery of the opening 12. The cylindrical wall 13 is formed in its inner circumference with a plurality of detents 14 with somewhat rounded inclines which are circumferentially substantially evenly spaced. The cylindrical wall 13 is also formed therein with four slits 15 spaced circumferentially by an angle of 90° to provide four arcuate sections separated by the slits 15 and given resilient deformability. The cylindrical wall 13 projects into a circular groove 33 formed in the shoulder 27 of the sleeve 23 of the sensor joint 20 concentric with the rotation axis. As shown in FIGS. 9, 11,12, and 13, a diametrically opposed pair of cam projections 34 projects in the groove 33 to be each engageable with one of the detents 14 in the cylindrical wall 13. While rotating the sensor joint 20 about its rotation axis, the cam projection 34 riding over the inclines of the detents 14 by resiliently flexing the divided sections of the cylindrical wall 13 outwardly, as indicated by arrows in FIG. 13, thereby giving a clicking rotational movement to the sensor joint 20, after which the divided sections of the cylindrical wall 13 are caused to return resiliently inwardly for locking engagement of the cam projections 34 into the corresponding detents. In this manner, the sensor joint 20 is allowed to rotate in a stepwise, i.e., clicking manner so that the coupling end of the sensor joint 20 can trace a circle A as indicated in FIG. 14. and is kept latched at a desired angular position as indicated at, for example, $a_1$ and $a_2$, in the figure. Thus, the cable 40 can be coupled to the sensor joint 20 vertically (FIG. 15 ), horizontally (FIG. 16), or at a suitable angle therebetween.

Second Embodiment <FIGS. 17 to 20>

Figure 17:
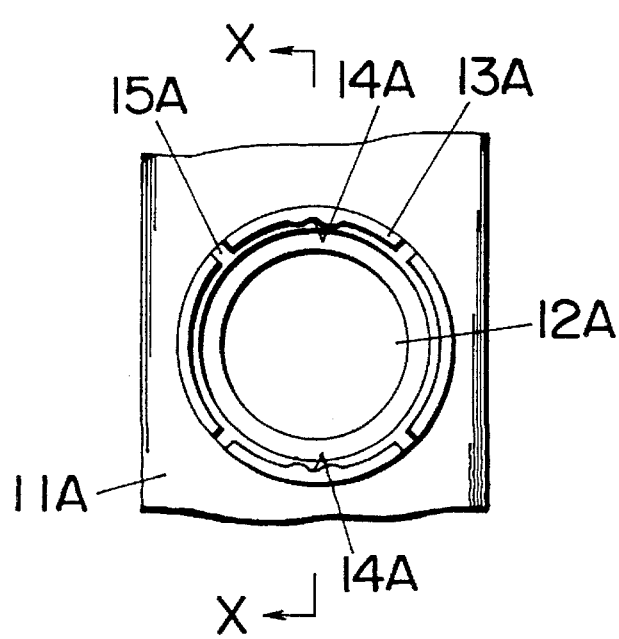
FIG. 17 illustrates a cylindrical wall extending from a portion of the casing in accordance with another embodiment of the present invention.
Figure 18:
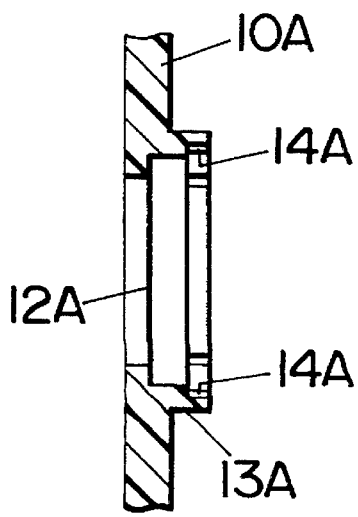
FIG. 18 is as sectional view taken along line X—X of FIG. 17.
Figure 19:
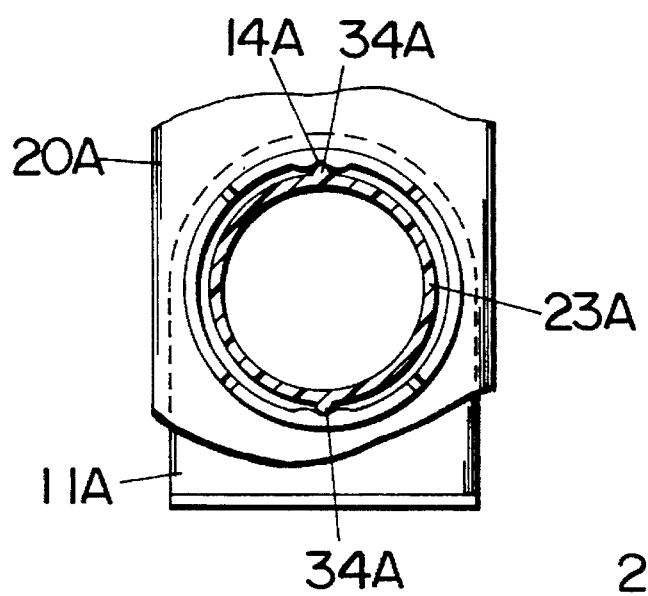
FIG. 19 is a view illustrating the engagement of the sensor joint of FIG. 17 and a cable connector.
Figure 20:
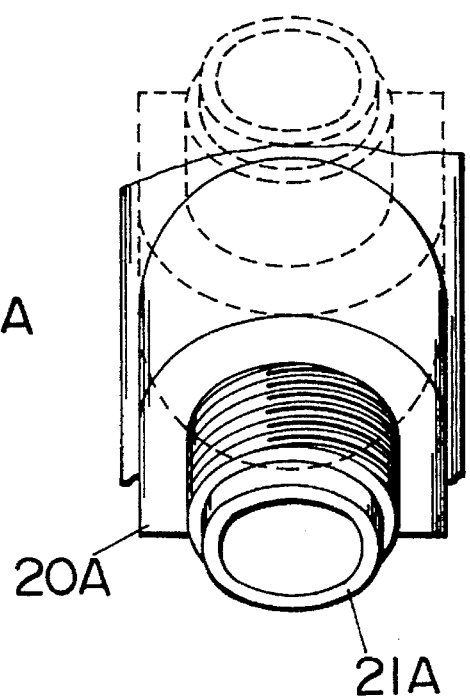
FIG. 20 is a view illustrating the angular displacement of the sensor joint of FIG. 17 relative to the casing.

A second embodiment of the present invention is identical to the first embodiment except that only a diametrically opposed pair of detents 14A is formed in the cylindrical wall 13A on the casing 10A. Like parts are designated by like numerals with a suffix letter "A" for easy reference purposes. As shown in FIGS. 17 and 18, the detents 14A are spaced by an angle of 180° to be engageable with a corresponding pair of cam projections 34A on the side of the sensor joint 20A. The detents 14A are so located that the sensor joint 20 A is kept latched at either of two angular positions for connecting the cable horizontally and vertically relative to the casing 10A.

Figure 21:
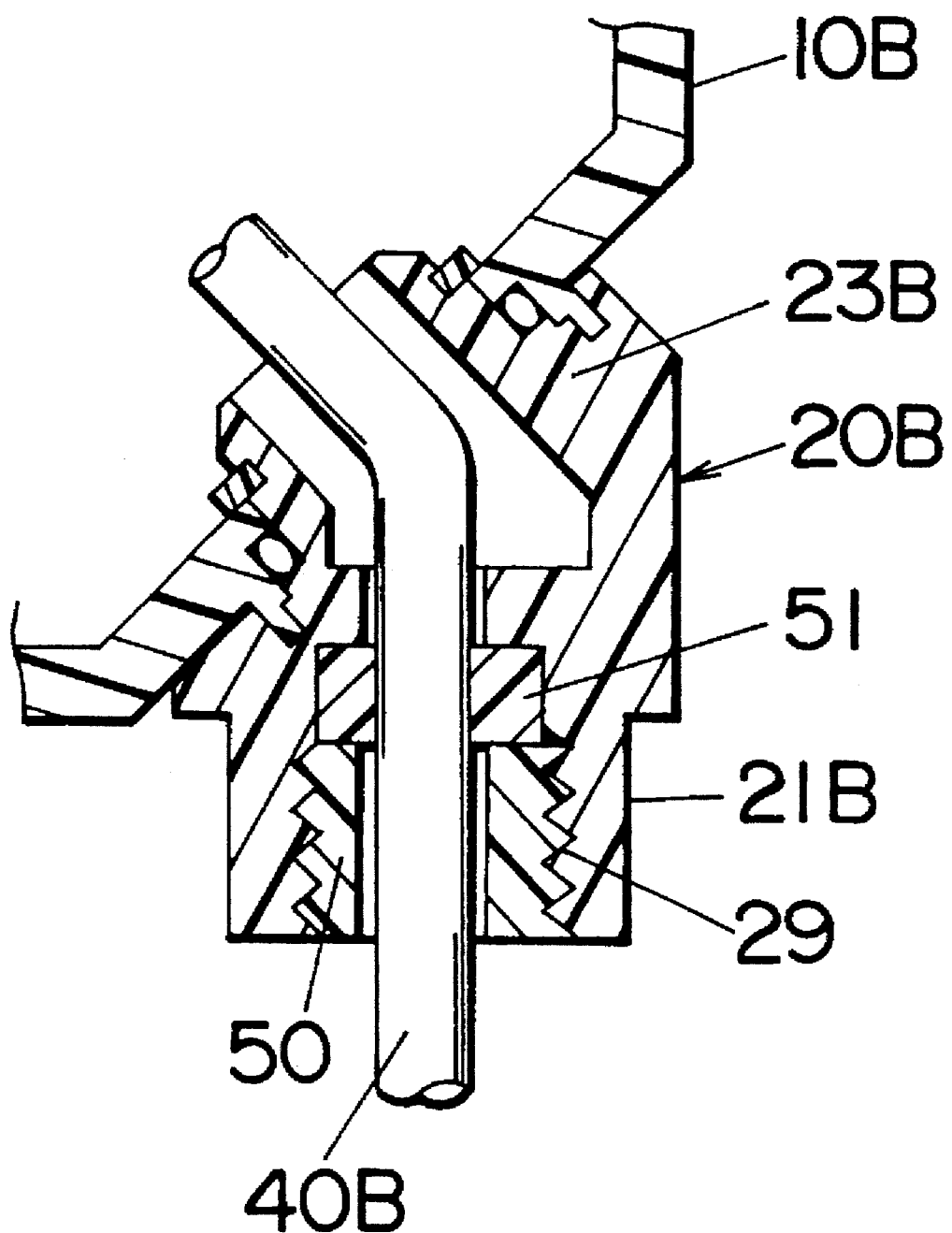
FIG. 21 is a sectional view of a connector assembly in accordance with a modification of the first embodiment.

Although the above embodiment only shows the provision of the pin plug in the sensor joint 20 for electrical connection between the photoelectric sensor 1 and the cable through the pin plug and the associated socket in the cable connector, it is equally possible to utilize other types of electrical connection, such as by directly leading the cable through the sensor joint to the photoelectric sensor without the use of the cable connector. FIG. 21 shows such modification in which the cable 40B is guided through the sensor joint 20B as being bent therein. The sensor joint 20B has a tube body 21 B which is angled at 45° relative to the sleeve 23B and is formed with an internal thread 29. A threaded fitting 50 is engaged in the tube body 21B to retain a sealing member 51 around the cable 40B. Also, in this modification, the cable 40B can be routed from the casing at a desired angle by rotating the sensor joint 20B about its rotation axis.

What is claimed is:

1. The combination of a connector assembly and a photoelectric sensor which comprises:

a casing accommodating the photoelectric sensor;

an angled sensor joint supported by said casing;

an electric cable connecting said photoelectric sensor to an external circuit; and a cable connector provided at an end of said electric cable and detachably coupled to said sensor joints said sensor joint having a rotation axis and capable of swiveling about said rotation axis relative to said casing;

latch means by which said sensor joint is secured in a suitable angled position about said rotation axis relative to said casing, said latch means being defined by parts of said casing and of said sensor joint;

said casing including a cylindrical wall extending from a periphery of an opening formed in said casing, and said sensor joint including a sleeve extending through said cylindrical wall into said opening, said latch means comprising a plurality of detents spaced around an inner circumference of said cylindrical wall and at least one cam which projects from said sleeve and rides over said detents to be lockable into any suitable one of said detents;

said cylindrical wall being formed with circumferentially spaced slits by which said cylindrical wall may flex radially outwardly to permit said cam to ride over inclines of said detents and which resiliently returns to bring said cam into lock engagement with said suitable one of said detents.

2. The combination as set forth in claim 1, wherein said detents comprise more than two detents spaced substantially evenly around the circumference of said cylindrical wall.

3. The combination as set forth in claim 1, wherein said detents consists of two detents spaced apart by 180° around the circumference of said cylindrical wall.

4. The combination as set forth in claim 1, wherein said sensor joint incorporates a set of pins each adapted to be connected at its one end to said photoelectric sensor and connected at its other end with a corresponding terminal of said cable connector.

5. The combination as set forth in claim 1, wherein said sensor joint includes a threaded end for thread engagement with a threaded ring provided at said cable connector.

* * * * *